ps://www.sec.gov/Archives/edgar/data/0000

(12) United States Patent
Spink

(10) Patent No.: US 6,584,996 B2
(45) Date of Patent: Jul. 1, 2003

(54) INSTALLING A VALVE IN A TANK

(75) Inventor: Kenneth M. Spink, Jerome, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/907,358

(22) Filed: Jul. 17, 2001

(65) Prior Publication Data

US 2003/0015235 A1 Jan. 23, 2003

(51) Int. Cl.$^7$ ............................. F16K 51/00; F16K 31/22

(52) U.S. Cl. ................. 137/315.11; 29/700; 137/15.18; 137/15.26; 137/315.08

(58) Field of Search ............................ 137/15.08, 15.17, 137/15.18, 43, 202, 587, 15.26, 315.01, 315.08, 315.11; 123/516; 29/213.1, 700

(56) References Cited

U.S. PATENT DOCUMENTS

| | | | | |
|---|---|---|---|---|
| 5,404,907 A | * | 4/1995 | Benjey et al. | 137/202 |
| 5,749,347 A | * | 5/1998 | Torii et al. | 137/43 |
| 5,960,816 A | * | 10/1999 | Mills et al. | 137/202 |
| 5,992,441 A | * | 11/1999 | Enge et al. | 137/202 |
| 6,035,883 A | * | 3/2000 | Benjey | 137/202 |
| 6,308,735 B1 | * | 10/2001 | Foltz | 137/587 |

* cited by examiner

Primary Examiner—George L. Walton
(74) Attorney, Agent, or Firm—Roger A. Johnston

(57) ABSTRACT

A fuel tank has a recess formed on the inner surface of the upper wall. A vent valve has a mounting portion extending therefrom with a resiliently deflectable disc formed thereon and a guide disc spaced from the deflectable disc. Upon insertion into the recess the deflectable disc is deflected and the periphery thereof frictionally engages the inner surface of the tank wall recess. The guide member slidably fits into the recess to prevent lateral movement of the mounting portion and removal from the recess.

15 Claims, 1 Drawing Sheet

INSTALLING A VALVE IN A TANK

BACKGROUND OF THE INVENTION

The present invention relates to the installation of a valve in the interior of a tank such as a float operated vent valve in the interior of a fuel tank, for example, a motor vehicle fuel tank, where the valve serves the purpose of controlling venting of fuel vapors from the tank.

In motor vehicle fuel tank systems, it is required to control the emissions of fuel vapor from the tank, particularly during refueling. Currently, production passenger car and light truck vehicles burning gasoline fuel have vapor vent lines from the tank connected to a storage container such as a canister filled with carbonaceous material for adsorption of the vapors during periods of vehicle engine shutdown, and for subsequent purge during vehicle engine operation.

Heretofore, fuel vapor vent valves for motor vehicle fuel tanks have been installed in the upper wall of the tank through an access opening in the tank provided for this purposes with a portion of the valve body or housing extending exteriorly of the tank and a portion with the float and float operated valve therein extending through the access opening into the interior of the tank.

The access opening for a fuel tank vapor vent valve must necessarily be at the highest point of the upper wall of the tank in order to be assured of being in the vapor dome within the tank. Thus, the access opening required for the vapor vent valve must be separately located from the access opening provided for installation in the tank of the float operated fuel level transducer or fuel level signal "sender" as such devices are often called. Such an arrangement thus requires attaching and sealing of the valve body about the separate access opening in the tank.

Currently many production motor vehicle tanks are formed of non-metallic material, such as molded plastic, of a composition having desired mechanical properties for robustness in service and mounting of the tank. This presents the problem of permeation of the vapors through the plastic wall of the tank where the material chosen for its mechanical properties is not impervious to the fuel vapors. The problem of vapor permeation through the tank wall has resulted in forming the tank with a barrier layer of relatively fuel impervious material in the wall of the tank which is otherwise formed of different more permeable material having the desired mechanical properties. This construction has presented problems in providing a fuel impervious seal about the vent valve body and the tank wall when a separate access opening for a vent valve is cut in the vapor barrier layer.

It has proven to be prohibitively costly and troublesome to attach the valve body to the tank wall by separate fasteners disposed about a sealing member for sealing about the separate access opening. Heretofore, in order to eliminate the costly use of separate fasteners, portions of the valve body have been formed of plastic material weldable to the tank wall material by any suitable weldment technique, as, for example, hot plate welding or spin welding.

However it has been found that the access opening in the vapor barrier layer of the tank wall provides a path for vapors to penetrate the more permeable material of the valve and tank wall and escape to the atmosphere.

The foregoing expediencies employed for providing a separate access opening in the tank for mounting a fuel vapor vent valve in the tank have proven to be difficult and quite costly during the manufacture and assembly of the tank prior to installation on the motor vehicle.

It has thus been desired to provide a way or means of installing the valve on the interior of the tank without separate fasteners or weldment and in a manner which maintains the integrity of the fuel vapor impervious barrier layer in the tank wall and eliminates the need for a separate access opening in the tank wall for installation of the valve.

BRIEF SUMMARY OF THE INVENTION

The present invention provides a technique for mounting a valve on the interior of a tank wall without the need for a separate access opening through the tank wall and without the need for fasteners or weldment. The invention relates particularly to mounting of a vapor vent valve on the interior of the upper wall of a fuel tank without the need for a separate access opening for the vapor vent valve and thus breaking of the fuel vapor barrier layer provided in a non-metallic tank wall.

The present invention provides a deflectable mounting member extending from a mounting portion the valve body which member is deflected when inserted in an interiorly formed recess in the tank wall. The periphery of the deflectable member frictionally engages the recess to retain the valve therein. A guide member is provided on the mounting portion, spaced from the deflectable member, and likewise extending outwardly from the mounting portion of the valve body and the guide member enters into the recess upon insertion of the deflectable member. The guide member contacts the inner surface of the recess and prevents lateral movement of the deflectable member so as to prevent removal of the deflectable member from its engagement with the recess. In the preferred embodiment, the deflectable member comprises a relatively thin disc having voids therein and preferably the voids comprise radially extending slots which form deflectable finger-like portions therebetween. In the preferred embodiment, the guide member also has a relatively thin disc-like configuration but slides freely into the mounting recess. The present invention thus enables the valve body mounting portion, deflectable member and guide to be formed in a one-piece construction, preferably by molding of plastic material.

DETAILED DESCRIPTION OF THE INVENTION

Figure 1:
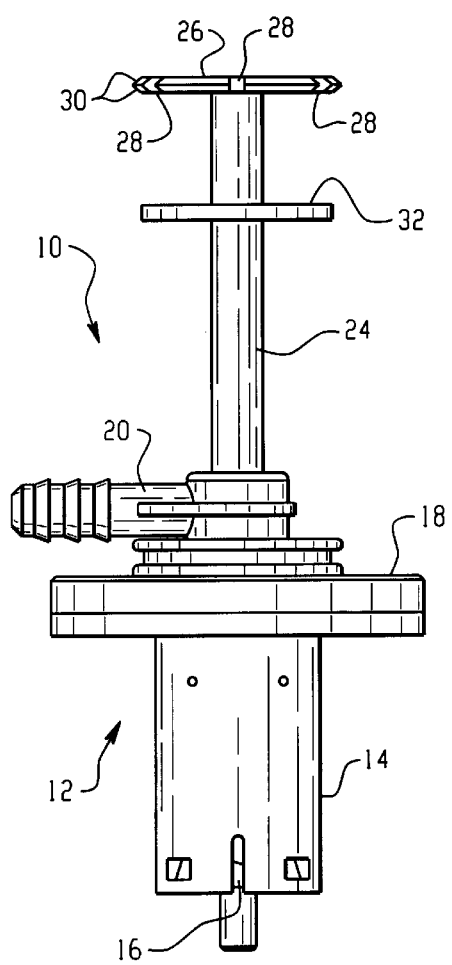
FIG. 1 is an elevation view of a valve employing the mounting provision of the present invention.
Figure 2:
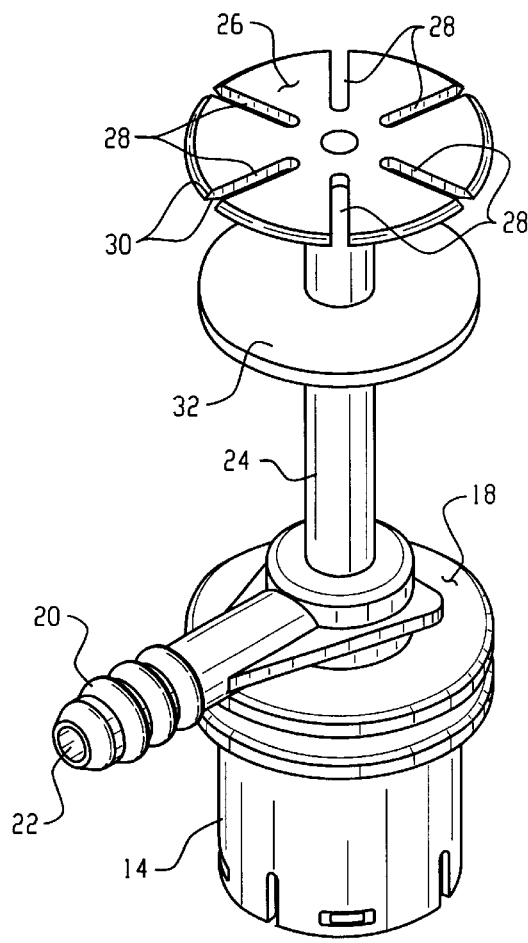
FIG. 2 is a perspective view of the valve assembly of FIG. 1.

Referring to FIGS. 1 and 2, the valve assembly is indicated generally at 10 and includes a valve body or housing indicated generally at 12 having a lower portion 14 containing a float assembly 16 and an upper portion 18 secured to the lower portion; and, with upper portion 18 having an outlet fitting 20 which has formed therein an outlet port 22. The function and operation of the float operated valve within the housing 12 for controlling vapor flow to the outlet port 22 is well known in the art and the description thereof has been omitted for the sake of brevity.

The valve housing upper portion 18 provided therewith and has extending upwardly therefrom a mounting portion 24 which preferably has an elongated rod-like configuration.

The mounting portion 24 has provided at the upper end thereof a resiliently deflectable member outstanding therefrom, denoted by reference numeral 26, which member 26 preferably has a relatively think disc-like configuration with voids 28 formed therein providing resiliently deflectable portions between the voids. In the presently preferred practice, the deflectable member 26 has the voids configured in the form of radially outwardly extending slots as shown in FIG. 2. The outer periphery of the disc 26 is chamfered to provide a relatively sharp edge; and, in the preferred practice is chamfered on both sides as denoted by reference numeral 30, the purpose of which will be described hereinafter in greater detail.

A guide member 32 is disposed along mounting portion 24 and outstanding therefrom in spaced arrangement with the deflectable member 26; and, guide member 32, in the presently preferred practice, has a relatively thin disc configuration as shown in the drawings. In the present practice of the invention the mounting portion 24, deflectable member 26 and guide member 32 are preferably formed integrally as a one-piece member and preferably by molding of a suitable resinous or plastic material. It will be understood however that the mounting portion 24, may be formed separately from the valve body 12, as may also members 26 and 32.

Figure 3:
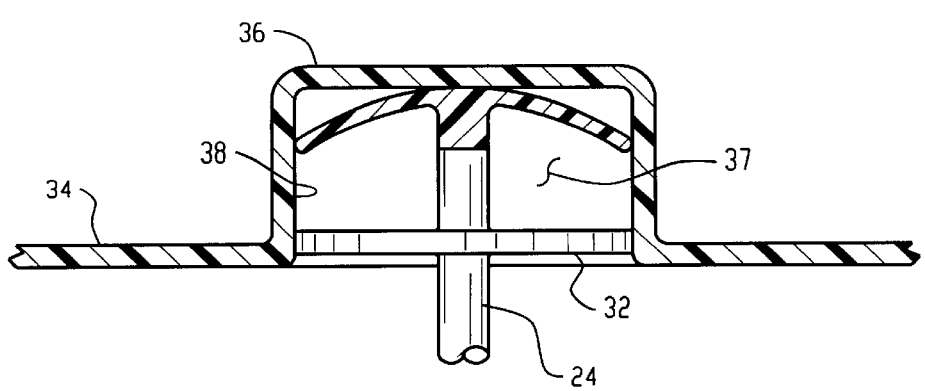
FIG. 3 is a section view taken through the wall of a fuel tank with the invention mounting portion of a valve assembly installed therein.

Referring to FIG. 3, a portion of the upper wall of a fuel tank 34 is shown as having a raised or inverted cup-shaped portion 36 which has the inner periphery 38 thereof formed to provide a recess 37 for mounting valve assembly 10.

The outer periphery of the deflectable member 26 is sized so as to provide a slight interference fit with the inner periphery 38 of the recess 37 in the upper tank wall. In the present practice of the invention, the outer periphery of the guide member 32 is formed to provide a closely fitting but free-sliding fit within the inner periphery 38 of the base portion of the upper tank wall. However, alternatively the guide member 32 could be formed similar to the deflectable member 26 and both could be deflectable. However, an alternative arrangement would require a greater installation force.

It will be understood with reference to FIG. 3 that, upon installation, as the deflectable member 26 is inserted into the recess 38, the outstanding portions of the member 26 are deflected into an umbrella-like configuration as illustrated in FIG. 3 with the sharp peripheral edge thereof, formed by chamfers 30, frictionally engaging recess wall 38 prevent removal thereof. The guide member 32 slidably contacts the inner wall of the recess 38 for preventing lateral movement of the mounting portion 24 once the valve is installed in the recess 38.

The present invention thus provides a unique and novel technique for installing a valve in the inner wall of a tank and particularly a vapor vent valve in the upper wall of a fuel tank without the need for a separate access opening in the tank wall, fasteners or weldment.

Although the invention has hereinabove been described with respect to the illustrated embodiments, it will be understood that the invention is capable of modification and variation and is limited only by the following claims.

What is claimed is:

1. A method of attaching a valve to the inside surface of a tank comprising:
    (a) providing a mounting portion one end of the valve;
    (b) disposing a resiliently deflectable outstanding member on the mounting portion and disposing a second outstanding member spaced from the deflectable member;
    (c) providing a recess in the inner surface of the wall of the tank and sizing said deflectable member for an interference fit in said recess;
    (d) engaging the periphery of said deflectable member with the inner surface of the recess when said deflectable member is inserted in said recess, deflecting said deflectable member as it moves within said recess, and inserting said second outstanding member in said recess and frictionally retaining said mounting portion in said recess for guiding and aligning said deflectable member within said recess.

2. The method defined in claim 1, wherein said step of providing a recess includes molding a recess having a cylindrically configured inner wall.

3. The method defined in claim 1, wherein said step of providing a deflectable member includes providing a relatively thin disc.

4. The method defined in claim 1, wherein said step of providing a resiliently deflectable member includes providing a relatively thin disc having a plurality of circumferentially spaced voids therein.

5. The method defined in claim 4, wherein said step of providing a disc with voids includes providing a plurality of radially extending slots.

6. The method defined in claim 1, wherein said step of providing said second outstanding member includes sizing the periphery thereof for a free sliding fit in said recess.

7. The method defined in claim 1, wherein said step of providing a deflectable member and providing a second outstanding member comprise integrally molding a one piece member.

8. The method defined in claim 1, wherein said step of providing a deflectable member includes providing a relatively thin disc.

9. A valve assembly for installation in a tank from the interior thereof comprising:
    (a) a valve housing having an outlet and a valve for controlling flow to the outlet;
    (b) a mounting portion disposed on one end housing, and having thereon an outstanding deflectable member adapted for insertion and frictional engagement with a recess in the inner surface of the wall of the tank for frictionally retaining the mounting portion in the recess; and,
    (c) a guide member outstanding from the mounting portion and disposed in spaced relationship from the deflectable member for guiding and aligning said deflectable member within said recess.

10. The assembly defined in claim 9, wherein said deflectable member has the periphery thereof sized for an interference fit in a tank recess.

11. The assembly defined in claim 9, wherein said deflectable member comprises a relatively thin disc.

12. The assembly defined in claim 11, wherein said disc includes a plurality of circumferentially spaced voids.

13. The assembly defined in claim 12, wherein said voids comprise radially extending slots.

14. The assembly defined in claim 9, wherein said mounting portion, said deflectable member and said guide member are formed integrally as one piece.

15. The assembly defined in claim 14, wherein said one piece is formed by molding.

* * * * *